United States Patent [19] … [11] Patent Number: 5,911,894
Colling … [45] Date of Patent: Jun. 15, 1999

[54] ENHANCED CONTACT AREA QUICK RELEASE MIG GUN TIP

[75] Inventor: Ronald W. Colling, Appleton, Wis.

[73] Assignee: Miller Electric Manufacturing Company, Appleton, Wis.

[21] Appl. No.: 09/087,661

[22] Filed: Jun. 1, 1998

Related U.S. Application Data

[63] Continuation of application No. 08/579,123, Dec. 27, 1995, Pat. No. 5,760,373.

[51] Int. Cl.⁶ ..................................................... B23K 9/24
[52] U.S. Cl. ......................................................... 219/137.61
[58] Field of Search ............................... 219/137.61, 136, 219/137.31, 137.2

[56] References Cited

U.S. PATENT DOCUMENTS

| | | |
|---|---|---|
| 2,666,832 | 1/1954 | Landis et al. . |
| 2,761,046 | 8/1956 | Herrick et al. . |
| 2,769,894 | 11/1956 | Rives . |
| 2,797,301 | 6/1957 | Copleston . |
| 2,808,498 | 10/1957 | Hudson et al. . |
| 3,007,033 | 10/1961 | Newman et al. . |
| 3,025,387 | 3/1962 | Kinney . |
| 3,143,633 | 8/1964 | Wadleigh . |
| 3,207,885 | 9/1965 | Rieger . |
| 3,283,121 | 11/1966 | Bernard et al. . |
| 3,428,778 | 2/1969 | Blackman et al. . |
| 3,469,070 | 9/1969 | Bernard et al. . |
| 3,514,570 | 5/1970 | Bernard et al. . |
| 3,544,758 | 12/1970 | dal Molin . |
| 3,689,733 | 9/1972 | Matasovic . |
| 3,909,585 | 9/1975 | Sanders et al. . |
| 4,250,366 | 2/1981 | Erickson et al. . |
| 4,268,740 | 5/1981 | Sanders . |
| 4,282,419 | 8/1981 | Auer . |
| 4,297,561 | 10/1981 | Townsend et al. . |
| 4,361,747 | 11/1982 | Torrani . |
| 4,403,136 | 9/1983 | Colman . |
| 4,482,797 | 11/1984 | Shiramizu et al. . |
| 4,544,827 | 10/1985 | Cusick, III . |
| 4,554,432 | 11/1985 | Raloff . |
| 4,560,858 | 12/1985 | Manning . |
| 4,695,702 | 9/1987 | Gartland . |
| 4,702,539 | 10/1987 | Cusick, III et al. . |
| 4,791,266 | 12/1988 | Gerard . |
| 4,864,099 | 9/1989 | Cusick, III et al. . |
| 4,937,428 | 6/1990 | Yoshinaka et al. . |
| 4,945,208 | 7/1990 | Lian . |
| 4,978,831 | 12/1990 | Lian . |
| 5,097,108 | 3/1992 | Hamal . |
| 5,338,917 | 8/1994 | Stuart et al. . |
| 5,349,158 | 9/1994 | Mari . |
| 5,384,447 | 1/1995 | Raloff et al. . |
| 5,440,100 | 8/1995 | Stuart et al. . |
| 5,760,373 | 6/1998 | Colling ................................ 219/137.61 |

*Primary Examiner*—Clifford C. Shaw
*Attorney, Agent, or Firm*—Schwartz & Weinrieb

[57] ABSTRACT

A quick release mig gun tip comprises a contact tip having an exterior frusto-conical surface and external threads, and a gas diffuser having an internal frusto-conical surface and internal threads. The threads are preferably stub acme threads. The contact tip is assembled to the gas diffuser by engaging their threads until the frusto-conical surfaces mate. Large currents can be conducted through the frusto-conical surfaces and the threads without causing excessive resistance heating. The contact tip threads are designed so that assembly and release of the contact tip requires only one turn relative to the gas diffuser.

20 Claims, 1 Drawing Sheet

U.S. Patent    Jun. 15, 1999    5,911,894
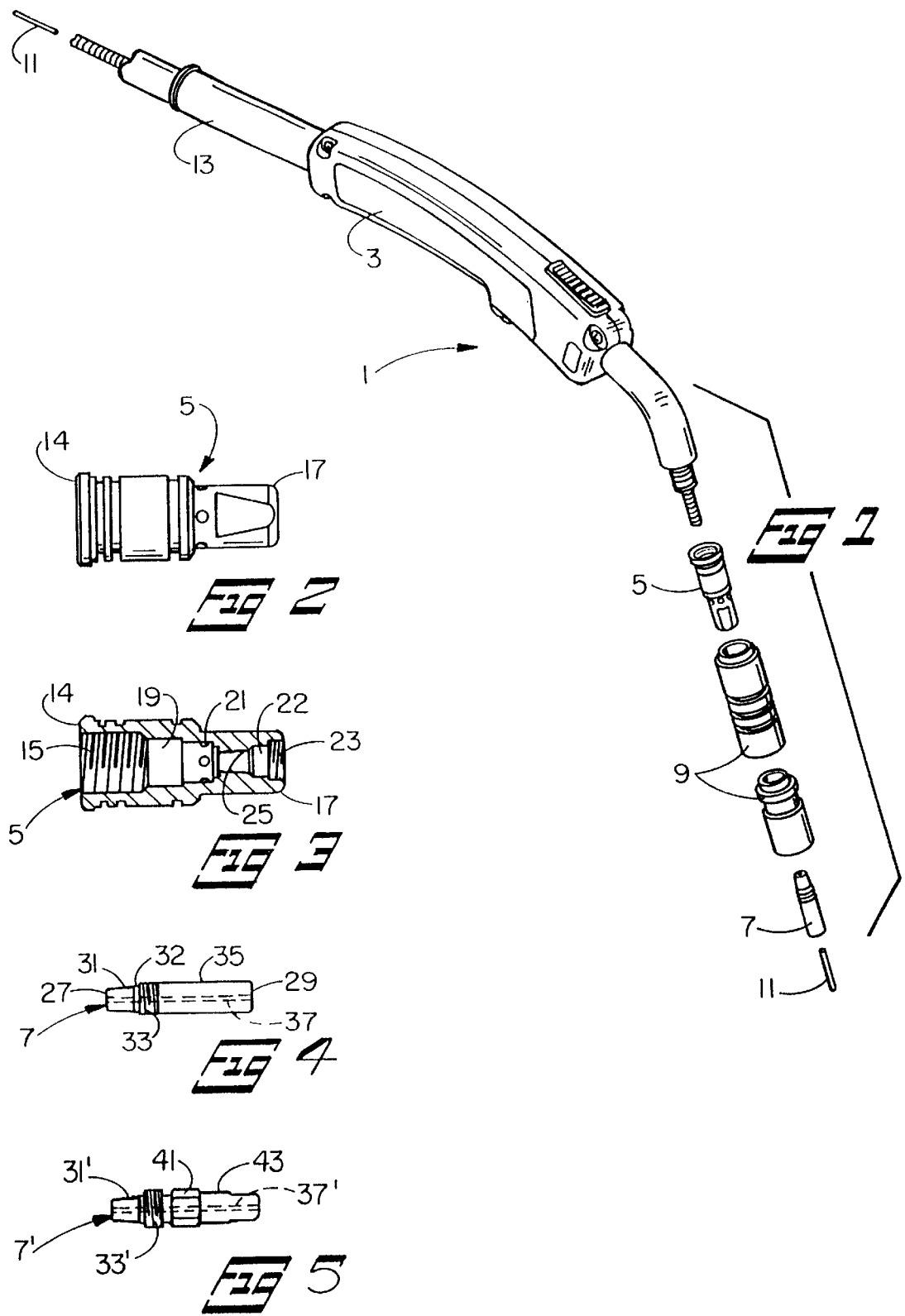

ENHANCED CONTACT AREA QUICK RELEASE MIG GUN TIP

This patent application is a continuation patent application of prior U.S. patent application Ser. No. 08/579,123, filed Dec. 27, 1995, now U.S. Pat. No. 5,160,373.

BACKGROUND OF THE INVENTION

1. Field of the Invention

This invention pertains to arc welding, and more particularly to apparatus incorporated into the welding gun of wire welding machines.

2. Description of the Prior Art

In metal inert gas (mig) welding, the gun contact tip must satisfactorily perform two important functions. First, it must accurately guide the weld wire to the point of contact with the workpiece. Second, it must conduct adequate current, which can be as high as 400 amps and more, to the weld wire. To achieve those results, it is well known to provide a relatively long contact tip made of copper and having an axial hole therethrough. The hole is sized slightly larger than the diameter of the weld wire. The contact tip extends from a gas diffuser through which an inert gas is directed around the welding arc. Current to the contact tip is supplied to it through the gas diffuser.

Contact tips are particularly subject to at least two modes of failure. The first is burnback, which occurs if the feeding of weld wire through the contact tip is stopped while an arc is maintained. The second mode of failure is wearing of the through hole due to the abrasive nature of the weld wire material. In addition, because the contact tip is so close to the welding arc, and because the tip must carry high electrical currents, it becomes very hot. The high temperatures also have a deleterious effect on the contact tip, due in part because the hotter the tip becomes the softer it becomes, which makes it less resistant to wear from the weld wire.

Due to the severe operating conditions, contact tips have relatively short service lives. Consequently, they are treated as consumable items in the industry. Typically, contact tips are made as separate pieces that are threaded into the gas diffusers. When a contact tip has worn, it is threaded out of the gas diffuser and discarded, and a new one is screwed in place.

As noted above, in addition to the heat caused by the welding arc, another potential source of heat to the contact tip are the threads between it and the gas diffuser. That is, the threads can cause resistance heating. To minimize electrical resistance, the contact tip and gas diffuser threads have a relatively long engagement length and a fine pitch. A typical thread for prior contact tips and gas diffusers is 0.250–28 UNF with approximately 0.25 inches of axial engagement between the two parts.

However, the long engagement fine pitch thread presents a problem. Removing a worn contact tip from the gas diffuser requires several turns of the contact tip. For example, with 28 pitch threads, seven turns are necessary to produce 0.25 inches of axial movement for removal. If the weld wire has burned back and fused to the contact tip, the weld wire must twist through the same number of turns as the contact tip. The potential springback of the fully removed contact tip due to the twisted weld wire is annoying if not potentially dangerous. Moreover, the time required to disassemble the multiple turns also contribute to down time of the production area.

U.S. Pat. Nos. 5,338,917 and 5,440,100 show a welding gun in which a gas diffuser has a projection for contacting a channel of varying width in a contact tip. When installed together, the contact tip and gas diffuser contact each other at one point and along two lines. The total area of contact at the point and along the lines is quite small, thereby increasing the resistance heating produced by the welding current.

U.S. Pat. No. 2,761,049 shows a welding gun having a contactor tip received in and held by a cap nut to an elongated guide tube. There is a frusto-conical mating surface between the contactor tip and the guide tube. The contactor tip and cap nut are surrounded by a gas cup that is slidable along the guide tube. Replacing the contactor tip requires sliding the gas cup and turning the cap nut several turns both to remove the contactor tip and to install a new one. Because the cap nut is a separately removable piece, it is subject to loss or damage.

U.S. Pat. No. 2,808,498 shows an electrode contact tip buried deep in a welding gun. The weld wire emerges from the welding gun through a ceramic nozzle tip that is threaded into a water jacket. Replacement of the contact tip requires major disassembly and reassembly of the welding gun.

Thus, a need exists for improvements to the contact tips and gas diffusers of wire welding machines.

SUMMARY OF THE INVENTION

In accordance with the present invention, a quick release mig gun contact tip is provided that minimizes resistance heating between the contact tip and a gas diffuser. This is accomplished by fabricating the contact tip and the gas diffuser with simultaneously mating frusto-conical surfaces and stub threads, or other quick disconnecting mating engagement means.

The upstream end of the gas diffuser may be constructed to suit any desired weld wire gun handle. The various ports and passages for the shielding gas may also take any desired shape. The downstream end of the gas diffuser is fabricated with a frusto-conical interior surface having its apex end toward the gas diffuser upstream end. In the embodiment utilizing stub threads for the quick disconnecting engagement, the base end of the frusto-conical surface terminates in a stub thread having only a little more than one thread. The stub thread ends at the downstream edge of the gas diffuser.

The downstream end of the contact tip may be conventional. The upstream end is formed with a frusto-conical exterior surface of the same taper and diameters as the gas diffuser frusto-conical surface. The base end of the contact tip frusto-conical surface terminates in a stub thread that is the same as that of the gas diffuser. The contact tip stub thread has approximately a single turn of active thread.

With the contact tip assembled to the gas diffuser, the entire area of the frusto-conical surfaces of the two parts are in intimate facing contact with each other. In addition, the engaged areas of the threads of the two parts are in facing contact. The large areas of contact between the two parts enable them to handle heavy current with minimized resistance heating. Further, only one reverse turn of the contact tip is required to remove it from the gas diffuser when replacement is needed.

According to another aspect of the invention, the contact tip is manufactured very economically from polygon stock. The stock is extruded with a hexagon or similar external surface and with the weld wire hole. The downstream end of the contact tip is turned slightly to a cylindrical surface, leaving a portion of the hexagon surface for wrench flats. The stub threads are rolled up to the desired diameter, which is greater than the distance across exposing flats of the hexagon. The frusto-conical exterior surface is turned at the upstream end from the hexagon surface.

The method and apparatus of the invention, using mating frusto-conical surfaces and stub threads, thus conducts large currents without excessive heating. The stub threads conduct a significant portion of the current, even though they enable the contact tip to be removed from and replaced in the gas diffuser with a single turn.

BRIEF DESCRIPTION OF THE DRAWINGS

Other advantages, benefits, and features of the present invention will become apparent to those skilled in the art upon reading the following detailed description of the invention in conjunction with the drawings in which like reference characters designate like or corresponding parts throughout the several views, and wherein:

FIG. 1 is an exploded perspective view of a typical wire welding gun that includes the present invention.

FIG. 2 is a side view of the gas diffuser of the present invention.

FIG. 3 is a longitudinal cross sectional view of the gas diffuser of FIG. 2.

FIG. 4 is a side view on an enlarged scale of the contact tip of the invention.

FIG. 5 is a side view of a modified embodiment of the contact tip.

DETAILED DESCRIPTION OF THE ILLUSTRATED EMBODIMENTS

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, a typical wire welding gun 1 is illustrated that -includes the present invention. The particular wire welding gun 1 shown is merely representative of a wide variety of guns that can advantageously employ the invention. The gun has a handle 3 to which is joined one end of a gas diffuser 5. A contact tip 7 is threaded to the other end of the gas diffuser 5. A nozzle 9, which is usually adjustable on the gas diffuser 5, surrounds the gas diffuser and most of the contact tip 7. A long flexible weld wire 11 is fed to the handle 3 and the gas diffuser 5 and out the contact tip 7.

Electrical power is supplied to the gun 1 by cables represented at reference numeral 13. The power is conducted to the contact tip 7 by the gas diffuser 5, and from the contact tip 7 to the weld wire 11.

In accordance with the present invention, the gas diffuser 5 and contact tip 7 are designed to provide a quick release therebetween while conducting maximum current to the weld wire 11. In one embodiment, a bayonet connection in combination with mating frusto-conical surfaces is used. In the embodiment shown in FIGS. 2–4, the gas diffusers is generally tubular in shape, having an upstream end 14, a downstream end 17, and an axial passage 19. Internal threads 15 extend in the axial passage 19 from the upstream end 14. The threads 15 join with similar threads on the gun handle 3. Radial holes 21 pass through the wall of the gas diffuser 5 from the axial passage 19.

The axial passage 19 includes a tap hole 22 near the downstream end 17 of the diffuser 5. An internal stub thread 23 is machined into the tap hole 22. I have found that a 0.313–14 stub acme thread works very well. Preferably, the stub thread 23 has approximately 1.5 threads.

The tap hole 22 terminates at the base end of an interior frusto-conical surface 25 that is also part of the axial passage 19 such that the tap hole 22 as illustrated defines a transitional region between the thread 23 and the frusto-conical surface 25. The apex end of the frusto-conical surface 25 is located in the vicinity of the radial holes 21 a double-shouldered portion 26 being defined between, or separating, the apex end of the frusto-conical portion 25 and the radial holes 21 such that the radial holes 21 are disposed immediately upstream of the shouldered portion 26. An included angle of approximately ten degrees for the interior frusto-conical surface works very well.

The contact tip 7 has an upstream end 27 and a downstream end 29. A hole 37 extends axially through the interior of the contact tip 7 for its entire length. The contact tip 7 defines an exterior frusto-conical surface 31 at the upstream end 27 that has the same taper and diameters as the gas diffuser interior frusto-conical surface 25. At the base end of the contact tip frusto-conical surface 31 is a cylindrical surface 32 having a diameter slightly less than the diameter of the gas diffuser tap hole 22. The cylindrical surface 32 terminates in an external stub thread 33 and serves as a transitional region between the thread 33 and the frusto-conical surface 31. The contact tip stub thread 33 has the same diameter and pitch as the gas diffuser stub thread 23.

A working end 35 of the contact tip 7 extends from the stub thread 33 to the downstream end 29. The working end 35 may have a cylindrical surface as shown, a frusto-conical surface, or a combination of a cylindrical and frusto-conical surface. If desired, wrenching flats, not shown, can be formed on the working end of a cylindrical version.

The gas diffuser 5 and contact tip 7 are used by permanently screwing the threads 15 of the gas diffuser 5 to corresponding threads on the gun handle 3. The frusto-conical surface 31 of the contact tip 7 is inserted into the tap hole 22 and the frusto-conical surface 25 of the gas diffuser 5 until the contact tip threads 33 contact the gas diffuser threads 23. The initial angular orientation between the contact tip 7 and the gas diffuser 5 is relatively unimportant. The contact tip 7 is then turned until the external stub thread 33 thereon engages the gas diffuser internal stub thread 23. The contact tip 7 is further turned until the frusto-conical surface 31 thereon comes into contact with the gas diffuser frusto-conical surface 25. The stub threads 23, 33 and frusto-conical surfaces 25, 31 of the two parts 5, 7 are so dimensioned that the two frusto-conical surfaces 25, 31 mate after approximately one turn of the contact tip 7 in the gas diffuser 5, after their threads 23, 33 have initially engaged, and before the contact tip stub thread 33 has reached the end of the gas diffuser stub thread 23. That is, the contact tip stub thread 33 has approximately one turn of active thread, and the turning of the contact tip 7 into the gas diffuser 5 is limited by the contact between the frusto-conical surfaces 23, 33 and not by the contact tip thread 33 bottoming on the gas diffuser thread 23.

With the contact tip 7 assembled to the gas diffuser 5, the weld wire 11 can be fed through the gas diffuser passage 19 and to the contact tip hole 37. Considerable current can be conducted to the weld wire 11 by the gas diffuser 5 and contact tip 7 because of the large area of contact between the two parts provided by the mating frusto-conical surfaces 25 and 31. The stub threads 23 and 33 provide significant additional area of contact. Consequently, resistance heating in and between the parts during operation of the gun 1 is minimal.

When it is necessary to remove a spent contact tip 7, a single reverse turn is sufficient to release it from the gas diffuser 5. Twisting of a weld wire 11 burnt onto the contact tip 7 is thus limited to one turn. The axial movement corresponding to the single turn of the contact tip 7 is only approximately 0.07 inches. Similarly, a new contact tip 7 is assembled to the gas diffuser 5 with a single turn. The entire replacement process is accomplished with very little downtime.

A further advantage of the gun tip of the invention is the increased strength, as measured by thread stretch under torque, of the stub acme threads 23 and 33 compared with prior UNF threads 23, 33. The possibility of damage to the stub threads during the replacement process is thus reduced.

An unexpected benefit of the stub acme threads 23 and 33 coupled with the mating frusto-conical surfaces 25 and 31 is the increased torque retention they provide between the contact tip 7 and the gas diffuser 5 compared with prior quick release designs. The likelihood of the contact tip 7 working loose from the gas diffuser 5 during welding operations is therefore reduced. Also, the heating and cooling cycles inherent in the welding process may-cause permanent interference between mating UNF threads of prior designs. This problem does not exist in the stub thread design of the present invention.

Further in accordance with the present invention, in one embodiment the contact tip lends itself to be manufactured by an economical process. Turning to FIG. 5, a contact tip 7' is manufactured from a length of an extrusion of copper material having an hexagon periphery 41 and a through hole 37'. The working end of the contact tip 7' is turned to a cylindrical surface 43, leaving a portion of the hexagon periphery 41 as wrench flats. The stub threads 33' are rolled up from the smaller hexagon periphery to the 0.313 inches diameter of the threads 33'. The frusto-conical surface 31' is also turned from the hexagon periphery. The design of the contact tip 7' allows the greatest economy for material stock size.

Thus, it is apparent that there has been provided, in accordance with the invention, an enhanced contact area quick release mig gun tip that fully satisfies the aims and advantages set forth above. While the invention has been described in conjunction with specific embodiments thereof, it is evident that many alternatives, modifications, and variations will be apparent to those skilled in the art in light of the foregoing description. For example, a bayonet connection rather than stub threads can be used for the quick release tip. Accordingly, it is intended to embrace all such alternatives, modifications, and variations as fall within the spirit and broad scope of the appended claims.

I claim:

1. A quick release mig gun tip for use within a wire welding gun, comprising:

an elongate contact tip having first and second ends;

a hole extending between said first and second ends of said elongate contact tip for accommodating a weld wire;

an external frusto-conical surface, having an apex end at said first end of said elongate contact tip and a base end, for establishing surface-to-surface electrical contact with a mating frusto-conical surface of a gas diffuser;

quick connect/disconnect thread means defined upon said elongate contact tip and comprising approximately 1.5 threads for quickly assembling/disassembling said elongate contact tip to a gas diffuser as a result of approximately one turn of said elongate contact tip with respect to a gas diffuser; and a working end at said second end of said elongate contact tip.

2. The quick release mig gun tip of claim 1, wherein:

said quick connect/disconnect thread means are disposed at said base end of said frusto-conical surface; and said working end of said contact tip extends between said quick connect/disconnect thread means and said second end of said contact tip.

3. The quick release mig gun tip of claim 2 wherein the thread means is a stub acme thread.

4. A quick release mig gun tip as set forth in claim 1, further comprising:

a non-threaded transitional region interposed between said external frusto-conical surface and said quick connect/disconnect thread means of said elongate contact tip.

5. A mig wire welding gun, comprising:

a handle;

a gas diffuser joined at a first end thereof to said handle by means of a first internal thread, an internal frusto-conical surface, having an apex end and a base end, defined within said gas diffuser, and a second internal quick connect/disconnect thread means defined within a second end of said gas diffuser and comprising 1.5 threads for quickly assembling/disassembling said gas diffuser to a mig gun contact tip; and a mig gun contact tip assembled to said gas diffuser and defining an external frusto-conical surface, having an apex end and a base end, mating with said internal frusto-conical surface of said gas diffuser for establishing surface-to-surface electrical contact with said internal frusto-conical surface of said gas diffuser, and an external, quick connect/disconnect thread means engaged with said second internal quick connect/disconnect thread means of said gas diffuser and comprising 1.5 threads for quickly assembling/disassembling said contact tip with respect to said gas diffuser as a result of approximately one turn of said contact tip with respect to said gas diffuser.

6. The welding gun of claim 5, wherein:

said internal and external threads of said gas diffuser and said contact tip are stub acme threads.

7. The welding gun of claim 5, wherein:

said thread means and said frusto-conical surfaces of said contact tip and said gas diffuser are so dimensioned that said frusto-conical surfaces of said contact tip and said gas diffuser mate after one revolution of said contact tip within said gas diffuser, in a first direction, after said thread means of said contact tip and said gas diffuser have initially engaged, and before said thread means of said contact tip has reached the end of said thread means of said gas diffuser, so that said contact tip can be released from said gas diffuser by rotating said contact tip one revolution in a second reverse direction.

8. A mig wire welding gun as set forth in claim 5, wherein:

said handle comprises means for housing electrical cables for conducting electrical power from a source of electrical power;

said diffuser is joined to said handle for conducting said electrical power from said handle to said contact tip; and wire means is fed through said handle, said diffuser, and said contact tip for conducting said electrical power from said contact tip to a workpiece.

9. The mig wire welding gun of claim 8, wherein:

said gas diffuser has a passage extending therethrough between said first and second ends for accommodating said wire means; and said contact tip has an axial hole extending therethrough that surrounds said wire means.

10. A gas diffuser for use within a mig wire welding gun, comprising:

a housing having first upstream and second downstream ends with a passage extending axially between said first upstream and second downstream ends of said housing for accommodating a weld wire;

a first thread defined within said first upstream end of said housing for mounting said mig gun gas diffuser upon a mid wire welding gun;

quick connect/disconnect means defined within said second downstream end of said housing for mating with a mig gun contact tip so as to quickly assemble and disassemble said mig gun gas diffuser with respect to a mig gun contact tip;

an internal frusto-conical surface, having an apex end and a base end, defined within said housing for establishing surface-to-surface electrical contact with a mating frusto-conical surface of a mig gun contact tip;

a shouldered portion defined immediately upstream of said apex end of said internal frusto-conical surface; and a plurality of radially extending, circumferentially arrayed, gas diffuser holes defined within an annular wall portion of said housing at an axial location which is immediately upstream of said shouldered portion.

11. The gas diffuser as set forth in claim 10, wherein:

said quick connect/disconnect means of said gas diffuser comprises quick connect/disconnect internal threads.

12. The gas diffuser of claim 11 wherein the internal threads are stub acme threads.

13. The gas diffuser of claim 12 wherein the threads have approximately 1.5 threads.

14. A gas diffuser as set forth in claim 10, further comprising:

a non-threaded transitional region interposed between said internal frusto-conical surface and said quick connect/disconnect means of said housing.

15. A quick release mig gun tip for use within a wire welding gun, comprising:

an elongate contact tip having a longitudinal axis and first and second opposite axial ends;

a hole extending between said first and second ends of said elongate contact tip for accommodating a weld wire;

an external frusto-conical surface, having an apex end at said first end of said elongate contact tip and a base end, for establishing surface-to-surface electrical contact with a mating frusto-conical surface of a gas diffuser;

quick connect/disconnect thread means defined upon said elongate contact tip and comprising approximately 1.5 threads for quickly assembling/disassembling said elongate contact tip to a gas diffuser as a result of approximately one turn of said elongate contact tip with respect to a gas diffuser;

a substantially cylindrical working end extending from said quick connect/disconnect thread means to said second end of said elongate contact tip; and a plurality of hexagonal wrench flats defined upon an external portion of said substantially cylindrical working end of said elongate contact tip for facilitating rotation of said elongate contact tip about said longitudinal axis during a threaded connection of said elongate contact tip upon a gas diffuser.

16. A quick release mig gun tip as set forth in claim 15, wherein:

said elongate contact tip comprises a copper extrusion.

17. A quick release mig gun tip as set forth in claim 15, further comprising:

a non-threaded transitional region interposed between said external frusto-conical surface and said quick connect/disconnect thread means of said elongate contact tip.

18. A mig wire welding gun, comprising:

a handle;

a gas diffuser joined at a first end thereof to said handle by means of a first internal thread, an internal frusto-conical surface, having an apex end and a base end, defined within said gas diffuser, and a second internal quick connect/disconnect thread means defined within a second end of said gas diffuser and comprising 1.5 threads for quickly assembling/disassembling said gas diffuser to a mig gun contact tip; and a mig gun contact tip assembled to said gas diffuser, having a longitudinal axis extending between first and second opposite axial ends, having an external frusto-conical surface, comprising an apex end and a base end, mated with said internal frusto-conical surface of said gas diffuser for establishing surface-to-surface electrical contact with said internal frusto-conical surface of said gas diffuser, having an external, quick connect/disconnect thread means engaged with said second internal quick connect/disconnect thread means of said gas diffuser and comprising 1.5 threads for quickly assembling/disassembling said contact tip with respect to said gas diffuser as a result of approximately one turn of said contact tip with respect to said gas diffuser, having a substantially cylindrical working end extending from said quick connect/disconnect thread means to said second end of said elongate contact tip, and having a plurality of hexagonal wrench flats defined upon an external portion of said substantially cylindrical working end of said elongate contact tip for facilitating rotation of said elongate contact tip about said longitudinal axis during a threaded connection of said elongate contact tip upon said gas diffuser.

19. A mig wire welding gun as set forth in claim 18, wherein:

said handle comprises means for housing electrical cables for conducting electrical power from a source of electrical power;

said diffuser is joined to said handle for conducting said electrical power from said handle to said contact tip; and wire means is fed through said handle, said diffuser, and said contact tip for conducting said electrical power from said contact tip to a workpiece.

20. A quick release mig gun tip as set forth in claim 18, wherein:

said elongate contact tip comprises a copper extrusion.

* * * * *